UNITED STATES PATENT OFFICE.

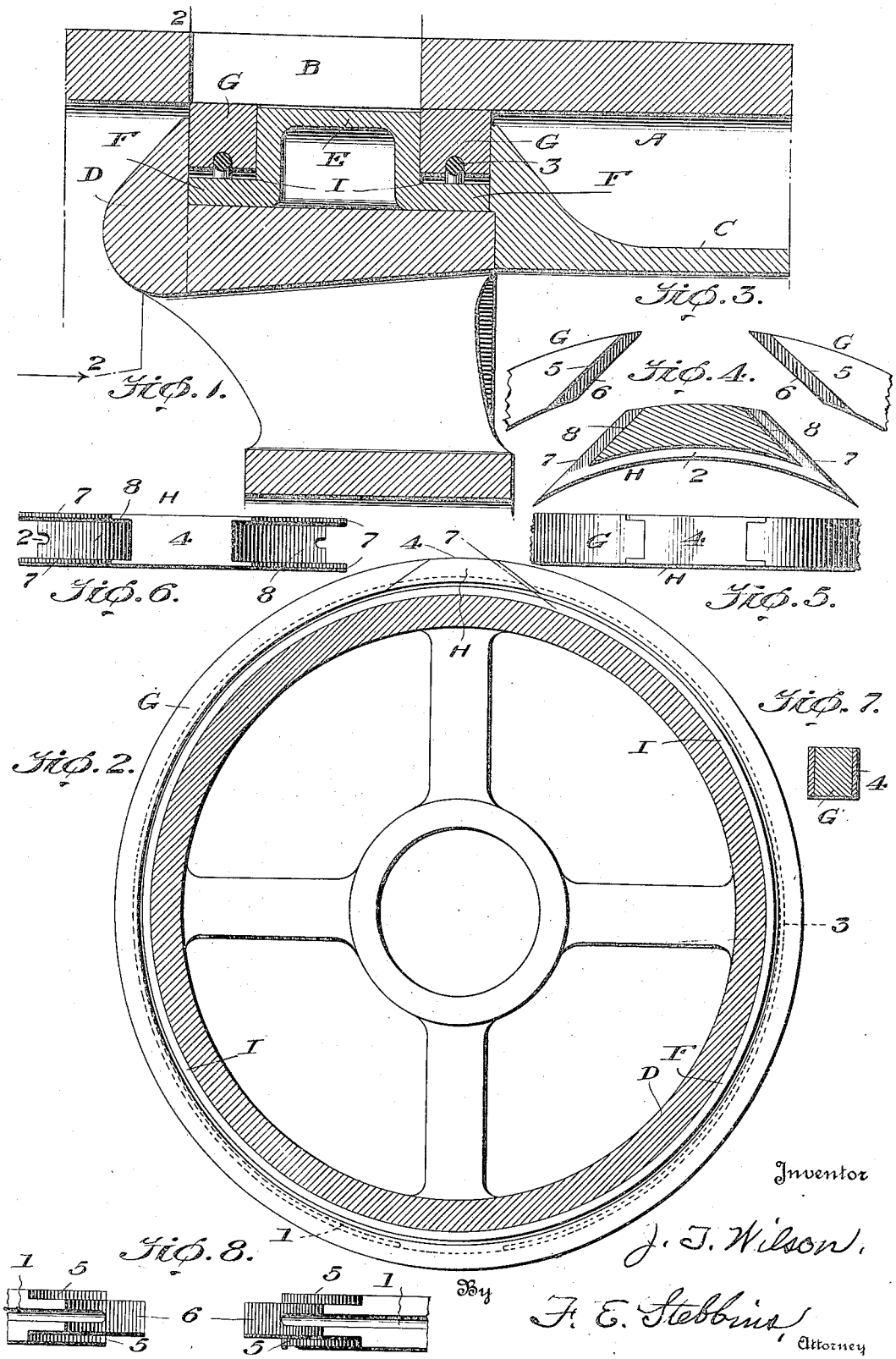

JOHN T. WILSON, OF ALAMEDA, CALIFORNIA.

PACKING FOR PISTONS AND PISTON-VALVES.

1,299,085.  Specification of Letters Patent.  Patented Apr. 1, 1919.

Application filed February 6, 1918. Serial No. 215,683.

*To all whom it may concern:*

Be it known that I, JOHN T. WILSON, a citizen of the United States, residing at Alameda, in the county of Alameda and State of California, have invented certain new and useful Improvements in Packings for Pistons and Piston-Valves, of which the following is a specification.

The object of my invention is the provision of an improved packing, commonly known as a packing ring, for pistons and piston valves which shall be of very simple construction, form a fluid tight joint, compensate for wear, and which can be shipped and handled without the displacement or loss of the joint piece forming a part thereof.

With this end in view, the invention consists in a cut, resilient metallic ring having a joint piece with a curved outer bearing surface for frictionally engaging the curved inner surface of a cylinder or cage, the joint piece fitting and interlocking with the separated ends of the ring so it will not rock sidewise, and will be held in place by means which will prevent its displacement when in use and when removed from the groove of the piston or piston valves.

The accompanying drawing illustrates an example of the embodiment of the invention constructed and the parts combined according to the best mode of procedure I have so far devised for the purpose.

Figure 1 is a cross section in elevation of part of the piston valve and part of a cage showing the position of the two rings relative to a port.

Fig. 2 is an end view in elevation of the entire valve on a smaller scale as seen when looking in the direction of the arrow, the flange of the head being in section on the line 2—2, the side of the ring and the edge of the bull ring appearing in full.

Fig. 3 shows in side elevation the separated ends of the ring, the joint piece being removed.

Fig. 4 is a central longitudinal vertical section of the joint piece.

Fig. 5 is a top plan view of the joint piece and the ends of the ring.

Fig. 6 is a top plan view of the joint piece removed.

Fig. 7 is a cross section of Fig. 2 on the oblique line 7.

Fig. 8 is a plan view of the inner surfaces of the ends of the ring, with the joint piece removed.

Referring to the figures, A is a section of a cage; B, a port therethrough; C, a part of the spool body of a piston valve; D, a removable head; E, a bull ring; F, the flanges of the bull ring; G, the packing rings; H, a joint piece; and I, the circular recesses or grooves within which the rings are loosely located.

The rings are resilient and, before insertion in the grooves, of a greater diameter than the diameter of the interior of the cage opening.

To maintain the joint piece H in place between the ends of the ring when the ring is shipped and handled, and also to force it outwardly between the free ends of the ring, the inner surface of the ring is provided with a groove 1, and the inner surface of the joint piece with a groove 2, and within the grooves is located a loose spring 3, as shown, the free ends being some distance apart so the body of the spring between its ends bears against the joint piece.

When a ring is placed in a groove and the piston valve inserted in the cage, the ring is contracted so the outer curved bearing surface and the outer curved bearing surface 4 of the joint piece frictionally engage the interior of the cage or cylinder, the ring being under tension, and the ring and joint piece match as shown in Fig. 2.

To prevent the joint piece rocking sidewise and to provide for wear and maintaining a tight joint, the ends of each ring is fastened with inclined surfaces 5, 5, and an inclined surface 6 located in a different plane, and the joint piece matches these surfaces, the same being fashioned with the inclined surfaces 7, 7 and 8 at each end.

The packing ring as a whole is very simple in construction, easily manufactured, can be handled without the loss of the joint piece, and when inserted in its groove and in use, maintains a tight joint, as the curved surface 4 of the joint piece provides an adequate bearing and wearing area. Moreover, the ring with the means for holding the joint piece in place "floats" in the recess I, that is, can bodily shift sidewise in the recess, as there is a space beneath the ring, and always fit the interior surface of the cage. This is a desirable feature and distinguishes the combination from many somewhat similar.

What I claim is:

1. An integral cut resilient metallic packing ring having each free end fashioned to form bearing surfaces 5 at opposite sides of the end of the ring and a bearing surface 6 at the extreme end of the ring in a plane parallel with the planes of said bearing surfaces 5, a joint piece provided with the exterior curved bearing surface 4 adapted to frictionally engage the curved bearing surface of a cage or cylinder and also having at the opposite ends the surfaces 7 and 8 the surfaces 7 matching the surfaces 5 at the ends of the ring and the surfaces 8 matching the surfaces 6 at the ends of the ring, and means for holding the joint piece in place.

2. An integral cut resilient metallic packing ring having each free end fashioned to form bearing surfaces 5 at opposite sides of the end of the ring and a bearing surface 6 at the extreme end of the ring in a plane parallel with the planes of said bearing surfaces 5, a joint piece provided with the exterior curved bearing surface 4 adapted to frictionally engage the curved bearing surface of a cage or cylinder and also having at the opposite ends the surfaces 7 and 8 the surfaces 7 matching the surfaces 5 at the ends of the ring and the surfaces 8 matching the surfaces 6 at the ends of the ring, and resilient spring means carried by the ring for holding the joint piece in place.

In testimony whereof I affix my signature.

JOHN T. WILSON.